United States Patent
Wright et al.

(10) Patent No.: US 10,651,610 B2
(45) Date of Patent: May 12, 2020

(54) ELECTRICAL CONNECTORS

(71) Applicant: IFPL Group Limited, Isle of Wight (GB)

(72) Inventors: John Michael Wright, Isle of Wight (GB); Geoffrey Paul Underwood, Isle of Wight (GB)

(73) Assignee: IFPL GROUP LIMITED, Isle of Wight (GB)

( * ) Notice: Subject to any disclaimer, the term of this patent is extended or adjusted under 35 U.S.C. 154(b) by 0 days.

(21) Appl. No.: 15/793,715

(22) Filed: Oct. 25, 2017

(65) Prior Publication Data

US 2018/0115123 A1 Apr. 26, 2018

(30) Foreign Application Priority Data

Oct. 26, 2016 (GB) .................................. 1618117.4

(51) Int. Cl.

| | |
|---|---|
| *H01R 13/73* | (2006.01) |
| *H01R 31/06* | (2006.01) |
| *H01R 24/76* | (2011.01) |
| *H01R 13/717* | (2006.01) |
| *H01R 24/60* | (2011.01) |
| *H01R 13/703* | (2006.01) |
| *H02J 3/14* | (2006.01) |
| *H01R 107/00* | (2006.01) |

(52) U.S. Cl.
CPC .......... *H01R 13/73* (2013.01); *H01R 13/717* (2013.01); *H01R 24/60* (2013.01); *H01R 24/76* (2013.01); *H01R 31/065* (2013.01); *H01R 13/7038* (2013.01); *H01R 13/7175* (2013.01); *H01R 2107/00* (2013.01); *H02J 3/14* (2013.01)

(58) Field of Classification Search
CPC .... H01R 13/6675; H01R 29/00; H01R 24/60; H01R 13/73; H01R 13/717; H01R 13/7175; H01R 24/76
See application file for complete search history.

(56) References Cited

U.S. PATENT DOCUMENTS

| 5,964,598 | A * | 10/1999 | Gonzales | ........... H01R 13/6397 |
| | | | | 439/133 |
| 7,438,589 | B1 | 10/2008 | Fleury et al. | |
| 7,815,469 | B1 * | 10/2010 | Nguyen | ............. H01R 13/6658 |
| | | | | 439/353 |
| 8,277,239 | B1 * | 10/2012 | Chan | .................... H01R 31/065 |
| | | | | 439/189 |

(Continued)

OTHER PUBLICATIONS

European Search Report issued in co-pending European Application No. 17198523 dated Jan. 31, 2018.

*Primary Examiner* — Briggitte R. Hammond
(74) *Attorney, Agent, or Firm* — Whiteford, Taylor & Preston, LLP; Peter J. Davis

(57) ABSTRACT

An electrical connector assembly (1), comprising a housing (2) and an electrical connector receptacle (3) arranged to receive a complementary electrical connector, the housing arranged to be mounted to a support structure, the electrical connector receptacle arranged to be removably received within the housing, the electrical connector receptacle comprises a tongue (30) with a plurality of electrical contacts (31) arranged to connect with electrical contacts of the complementary electrical connector.

13 Claims, 9 Drawing Sheets

(56) References Cited

U.S. PATENT DOCUMENTS

| | | | |
|---|---|---|---|
| 8,323,042 B2* | 12/2012 | Lin | H01R 13/443 |
| | | | 439/133 |
| 9,438,051 B2* | 9/2016 | Firman, II | H01R 13/6675 |
| 9,559,533 B2* | 1/2017 | Tew | H02J 7/0042 |
| 9,590,437 B2* | 3/2017 | Levy | H02J 7/0055 |
| 2003/0186592 A1* | 10/2003 | Potega | G01K 1/02 |
| | | | 439/676 |
| 2005/0032405 A1 | 2/2005 | Wu | |
| 2011/0084660 A1* | 4/2011 | McSweyn | H01R 13/6675 |
| | | | 320/111 |
| 2012/0149245 A1* | 6/2012 | Ralston | A61B 5/14532 |
| | | | 439/660 |
| 2015/0146348 A1 | 5/2015 | Liao | |
| 2015/0280379 A1 | 10/2015 | Yan et al. | |
| 2015/0357758 A1 | 12/2015 | Krietzman et al. | |
| 2015/0380886 A1 | 12/2015 | Oosterman et al. | |
| 2016/0111837 A1* | 4/2016 | Misener | H01R 13/506 |
| | | | 439/345 |
| 2016/0219728 A1 | 7/2016 | Balyan | |
| 2016/0233605 A1 | 8/2016 | Hernandez et al. | |
| 2016/0285220 A1 | 9/2016 | Haw | |

\* cited by examiner

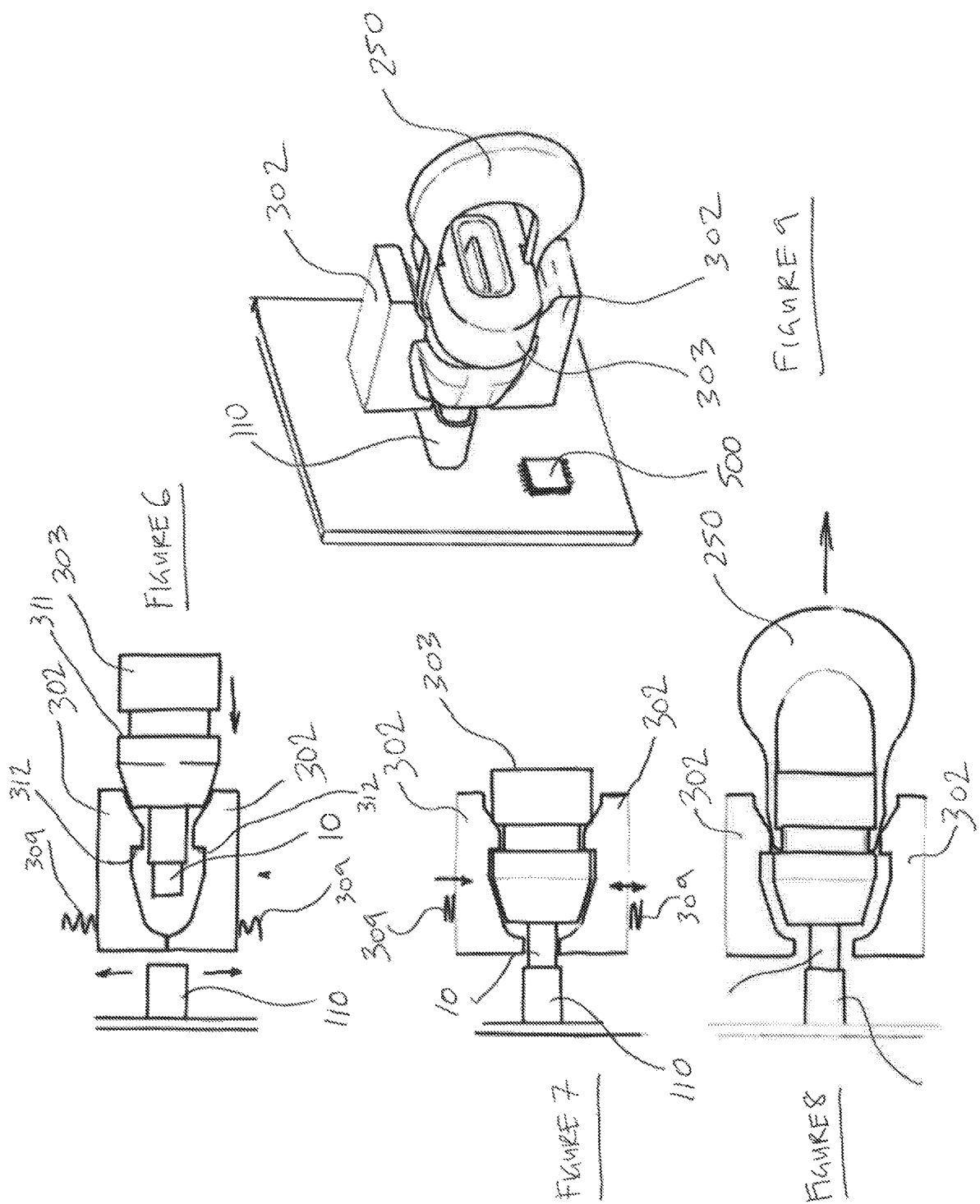

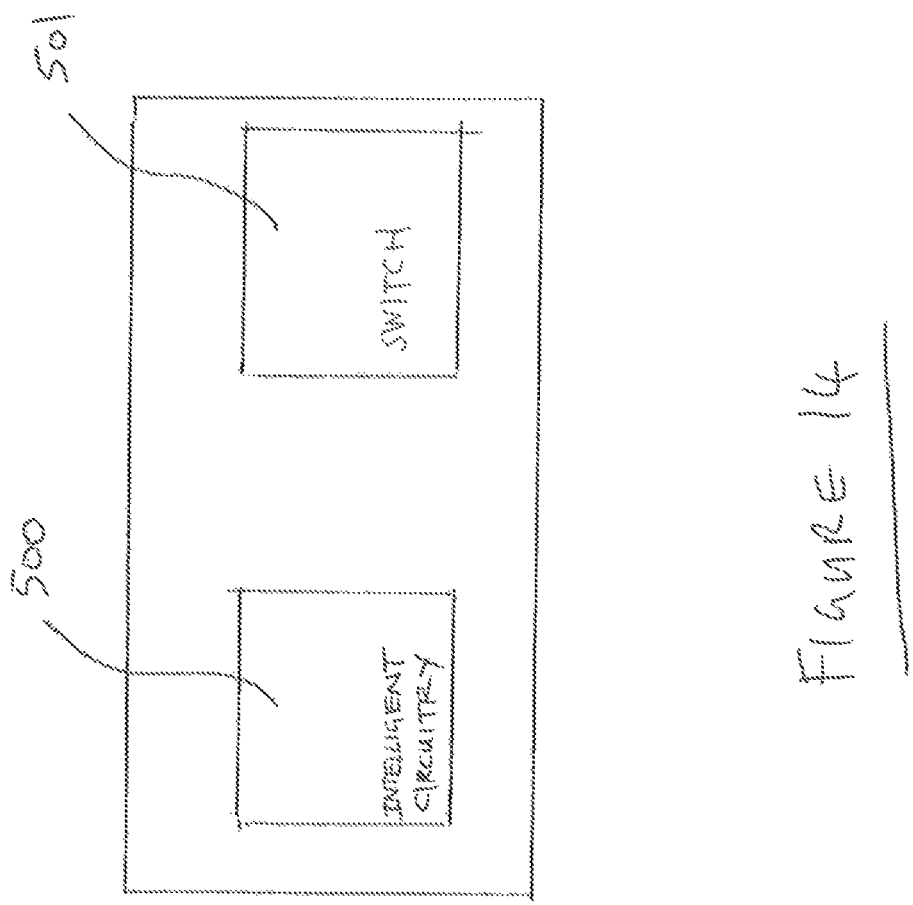

ELECTRICAL CONNECTORS

TECHNICAL FIELD

The present invention relates to electrical connectors, and in particular, although not exclusively, to electrical connectors for use by passengers in aircraft.

BACKGROUND

The use of standardised Universal Serial Bus (USB) sockets is widespread, allowing convenient connection to various types of electronic and electrical device, such as computers, mobile telephones, smartphones, tablet devices and peripheral devices, for example. Generally, USB sockets comprise a housing which houses a tongue provided with electrical contacts. However, repeated connection and disconnection of a USB plug to the socket can over time cause flexure and movement of the tongue. This, in turn, can result in damage to the tongue and/or contacts which renders it inoperative. This then necessitates a financial and time cost to replace a damaged socket. In the context of sockets provided in a cabin aircraft for use by passengers, time spent replacing broken or faulty sockets is a very sensitive time cost for an airline.

We seek to provide an improved electrical connector socket assembly.

SUMMARY

According to invention there is provided an electrical connector assembly, comprising a housing and an electrical connector receptacle arranged to receive a complementary electrical connector, the housing arranged to be mounted to a support structure the electrical connector receptacle arranged to be removably received within the housing, the electrical connector receptacle may comprise a tongue with a plurality of electrical contacts arranged to connect with electrical contacts of the complementary electrical connector.

The electrical connector receptacle may be termed a (removable and replaceable) cassette.

The receptacle preferably comprises an electrical connector socket.

The housing may comprise a rigid structure which comprises an opening and an internal space arranged to removably receive the electrical connector socket. The housing may be termed a host part for the receptacle. The housing may comprise multiple sidewalls.

'Housing' may be interpreted broadly and include a structure which is arranged to receive, and provide an electrical connection to, the receptacle.

The tongue may be substantially planar. The tongue may comprise a portion of printed circuit board. Electrical contacts may be provided on one side of the tongue or may be provided on one side only.

The electrical socket may be arranged to provide at least one of power, data transfer (such as audio and/or video) and signalling. The tongue may comprise multiple spaced-apart, side-by-side, electrical contacts. The tongue may comprise a formation one end of which is free and the other end of which is fixed/secured (and thereby allows a degree of deflection of the formation).

The tongue may be arranged to be received around a counterpart plug portion (of a complementary electrical connector).

The electrical connector receptacle may comprise a USB connector. The receptacle may comprise a USB-C compatible connector. The complementary electrical connector may comprise a plug.

The electrical contacts may provide for transfer of (high-speed) data transfer, power-ground, differential and connector orientation detection.

The USB connector capability may be substantially in accordance with a specification issued by the USB Implementations Forum, Inc. The USB connector capability may be in accordance with one of the following specifications, or other USB specifications, or successor specifications:

Universal Serial Bus 3.1 Specification
Universal Serial Power Delivery Specification
Universal Serial Bus Type C Specification.

The housing may be arranged to be permanently, fixedly or semi-permanently mounted/installed to the structure. The housing may be arranged to be embedded into a support/host structure or equipment.

The structure may be a (part of a) seat, or a wall or a bulkhead, and may be part of a vehicle, such as an aircraft.

The receptacle may comprise one or more surfaces/formations arranged to engage with an (internal) surface of the housing, to thereby retain the receptacle in position. The receptacle may comprise a latch or a clip. The latch may comprise a resiliently biased limb or jaw. The latch may comprise at least two resilient biased jaws which are arranged to be capable of opposed translational movement relative to one another.

The receptacle and the housing may be arranged to be connected together by way of a mechanical connection.

The housing may comprise a recess to receive substantially a major portion of the receptacle. The housing may be termed a host part for the receptacle.

A fastener may be arranged to connect the receptacle to the housing. A driveable head of the fastener may be arranged to be accessible from a front-facing portion of the receptacle. The fastener may be a threaded fastener. The receptacle may be provided with an aperture to receive the fastener.

The housing may comprise two resiliently biased jaws. The jaws may be arranged to open on insertion of the receptacle into the housing, and close around and engage with the receptacle when the socket in a home position. The jaws may be arranged to be (manually) openable to allow the receptacle to be removed from the housing. The housing may comprise a (rigid) enclosing structure to hold the jaws captive/retain the jaws.

The invention may be viewed as comprising a two-part electrical connector assembly.

The housing may comprise electrical interface arranged to be brought into electrical connection with an electrical interface of the receptacle. An internal surface of the housing may be arranged to guide the respective electrical interfaces into engagement.

The housing may comprise a light source. At least one of the housing and the socket may comprise a light guide, or is at least in part made of a light transparent or light transmitting material, or more generally may comprise a visual status indicator. At least one of the receptacle and the housing may be arranged to display light from an external/front-facing part. The light source may be provided on an internal surface or wall of the housing. At major portion of the body of the receptacle may be formed from a light guide material.

The visual status indicator of at least one of the housing or the receptacle may at least in part surround an opening of the socket for the complementary connector, or may be adjacent thereto.

The visual status indicator may comprise a discrete portion of the receptacle.

The visual status indicator may be arranged to display an operational status. The operational status may comprise a power delivery status (for example the extent to which power is available to be drawn).

The light display portion may be arranged to provide multiple visually discernible indications, which may include different colours and/or unbroken or variable illumination.

The assembly may further comprise a processor, or intelligent circuitry, either provided by the housing, or connected to the housing and provided remotely, which is operative to selectively control a power and/or a data connectivity to an interface of the housing which connects to an interface of the receptacle. The processor may be arranged to determine whether at least one of the following criteria is met: (i) a receptacle is present in the housing, (ii) the receptacle is provided with a required readable credential/authentication and (iii) a user device is connected to the receptacle, and to control the connectivity accordingly.

The assembly may comprise a processor or intelligent functionality, which serves to monitor power drawn by a connected user device from an upstream power source or upstream network. If the power drawn exceeds predetermined criteria, such as a power threshold or limit, the processor may be operative to control and/or modulate and/or regulate the power drawn, and thereby perform a power management functionality.

The processor may be configured to negotiate a power delivery service with a connected user device.

The assembly may comprise a switch, which is operable to disconnect or block a signal which is received from a connected user device, progressing upstream. The assembly may comprise a monitor to determine one or more predetermined characteristics of a signal which is to be blocked or a disconnect effected. The predetermined characteristics may comprise an incoming signal which meets or exceeds amplitude or frequency criteria. This may be representative of an electrical power signal. The processor may be arranged to disconnect the assembly and/or an interface of the assembly and/or the receptacle, from an upstream system connection or network or power source. Where multiple assemblies are arranged to provide power from a (single) power source, a power management device may be provided to monitor the cumulative power provided to the assemblies (drawn by connected user devices), and regulate the cumulative power available and/or arranged to be communicating with each assembly to set, negotiate or notify an available power to that, the or each assembly. This may be used as part of a power negotiation (signalling) process between an assembly and a connected user device. Each assembly may be addressable by the power management device and vice versa.

The intelligent functionality referred to in some or all of the three immediately preceding paragraphs above may conveniently be provided by a data processor.

The data processor may be attached to the housing.

The tongue of the socket may be substantially devoid of a latching formation arranged to retain the tongue to or resist detachment of the tongue from the complementary electrical connector. Side portions of the tongue may be substantially smooth. The tongue may be configured to minimise removal force, or to facilitate, detachment of the complementary connector from the tongue.

The assembly may comprise one or more features disclosed in the description or as shown in the drawings.

BRIEF DESCRIPTION OF THE DRAWINGS

Various embodiments of the invention will now be described, by way of example only, with reference to the following drawings in which:

FIG. 6 is a schematic side cross-sectional view of a third embodiment of the invention in a first condition, FIG. 7 is a schematic side cross-sectional view of the third embodiment in a second condition, FIGS. 8 and 9 are side cross-sectional and perspective views of the third embodiment in a third condition, FIG. 14 shows components of the assembly which relate to intelligent functionality thereof.

DETAILED DESCRIPTION

There is now described and shown an electrical connector assembly for receiving a complementary electrical connector. As will be described below, the assembly comprises a first part which is arranged to be mounted in a support structure, such as that shown in FIG. 1 at 600, and a second part which is arranged to be readily detachably connectable to the first part, and comprises an electrical connector socket. The first part may be arranged to be fixedly mounted in the structure. The second part being arranged to be readily detachable from the first part, advantageously allows a damaged or out-dated second part to be rapidly replaced. In the description which follows, the first part will be termed a housing and the second part a cassette.

Figure 1:
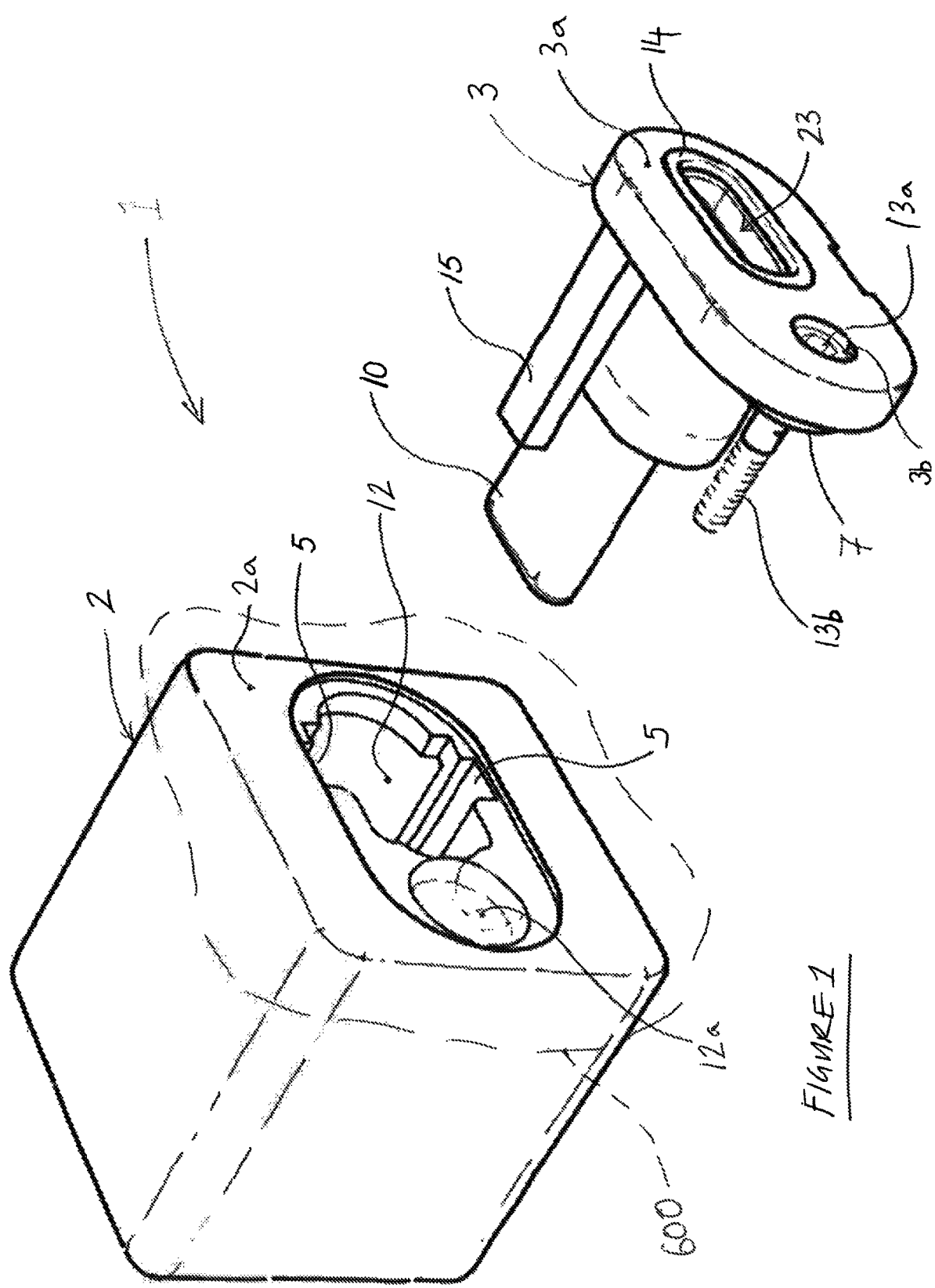
FIG. 1 is an exploded view of an electrical connector assembly.

Reference is made initially to FIG. 1 which shows an assembly 1 which comprises a housing 2 and a cassette 3. The housing 2 comprises an internal space which is shaped and dimensioned so as to receive the cassette 3, or at least a major portion thereof. A front-facing end 2a of the housing 2, which may be termed a front wall of the housing, is provided with an opening 12 and a further opening 12a. The opening 12a is arranged to receive a fastener device 13b, such as a bolt or screw which comprises a driveable head and a threaded shank. Internally of the housing 2 there is provided a complementary threaded portion (not illustrated) which is arranged to engage with the threaded fastener, and in use, thereby ensure that the cassette is secured in place to the housing 2. From the cassette side, the driveable head 13a of the fastener 13 is received in a recess 3b provided in the front-facing surface 3a of the cassette 3. The recess 3b is provided with an internal shoulder or land to locate the head and to limit rearward movement of the head. A rearward surface of the cassette (or what may be described as a rearward surface of the fascia of the cassette, on which surface 3a is provided), comprises a rearwardly extending formation 7 which is arranged to snuggly fit within the opening 12a, as bounded by its surrounding surface. This serves as a locating feature on insertion of the cassette into the housing, and limits lateral movement of the cassette when in position. The cassette 3 is provided with a formation for retaining the screw to the cassette, and to thereby minimise or avoid any relative translational movement between the fastener and the cassette during insertion or removal of the cassette, (along the longitudinal direction of the fastener).

This captive feature may be by way of an undercut in the screw. The cassette has a feature that snaps into the undercut of the screw; it takes some pressure to assemble the two components. By turning the screw clockwise the cassette is drawn into the housing which helps to ensure correct alignment and fit. On the converse, when undoing the screw the cassette is pulled out of the housing as the screw turns. This also ensures that the fitter does not lose any parts or damage the items surrounding the cassette.

Figure 4:
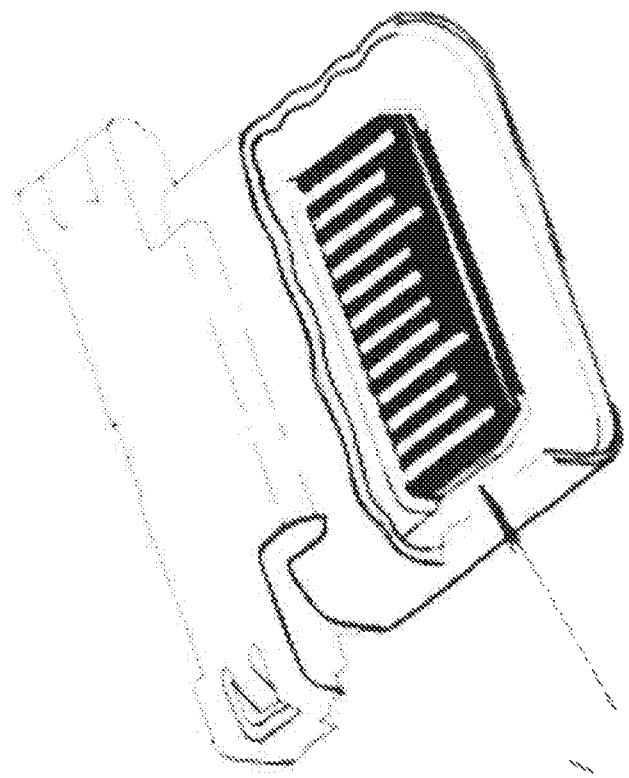
FIG. 4 shows a modified electrical connector socket.
Figure 2:
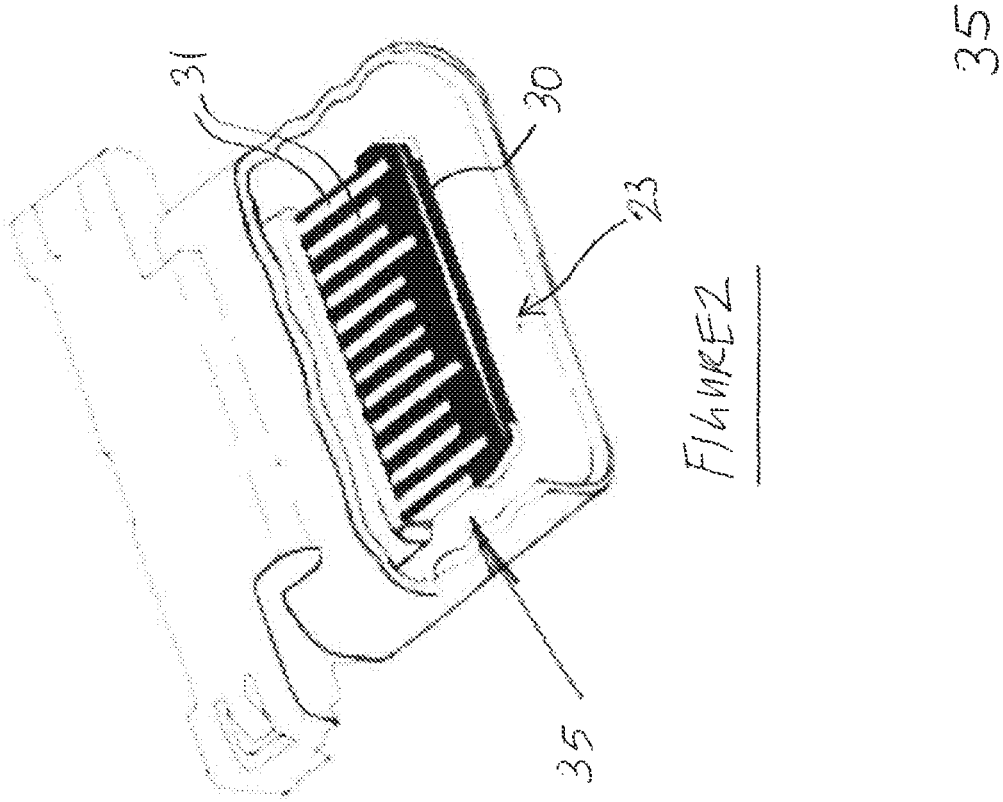
FIG. 2 is a cut-away perspective view of an electrical connector socket of the assembly of FIG. 1.

With further reference to the cassette 3, there is provided an electrical connector socket, as best seen in FIG. 2. The internal space of the socket is accessible by way of an opening 23, provided in the front facing part 3a of the cassette 3. As can be seen in FIG. 2, the electrical connector socket comprises a tongue, which is provided with a series of electrical contacts 21 on both first and second sides of the tongue. The tongue 30 is of the Universal Serial Bus (USB) type, and in particular of the USB-C type. (However, it will be appreciated that the arrangement of the housing and cassette may be employed with different connector types.) Side regions 35 of the tongue are provided with indents or cut-outs which serve to provide retention engagement with a counterpart electrical condition in the connected condition. An internal space extends around the tongue 30 so as to accommodate the body of the counterpart electrical connector (plug). The opportunity is taken to refer to the socket shown in FIG. 4 which is a modified version of that shown in FIG. 2. In this embodiment the side portions 35' of the tongue are devoid of a latching feature. The side portions 35' are linear and smooth. This advantageously serves to facilitate detachment of a complementary plug, and thereby reduces the potential for damage to the tongue or its contacts.

In the embodiments below, where appropriate, like reference numerals are used to describe like, or very similar, features.

The cassette 3 further comprises an interface 10 arranged to come into electrical contact with an interface provided within the housing 2. The interface 10 provides a series of electrical contacts which are connected to the electrical contacts 21 of the tongue 30. The interface 10 is provided at a rearward portion of the cassette. In use, when the cassette is inserted into the housing 2, and the fastener 13b screwed into place, the electrical contacts of the interface 10 of the cassette will come into electrical connection with the electrical contacts of the interface of the housing.

The cassette 3 further comprises two guide limbs 15 which extend rearwardly from the forward portion 3a. (Please note that only one limb is shown in FIG. 1.) Each limb is of substantially elongate formation, and the two limbs are located to opposite sides of the socket. Within the space 12 of the housing 2 there are provided respective channels 5 which are arranged to receive the guide limbs. The guide limbs serve to provide mechanical alignment/location for the cassette when being inserted into position and thus ensuring that the respective electrical interfaces of the cassette and the housing are correctly aligned to form a connection.

Surrounding the opening 23 there is provided a status indicator portion 14 which is arranged to be illuminated by a light source. As will be described below, this may be used to provide an indication to a user as to the service or operational status of the socket. The portion 14 comprises a light transmission material. The light source (which may comprise an LED) may be located in the cassette, or in the housing. In the latter case, which may be preferable so as to minimise production costs and simplify production of the cassette, the cassette may conveniently be made at least in part of a light transmission material, such as a transparent or translucent material. The front surface 3a of the cassette may be provided with a light occluding material such that only a determined portion thereof illuminates light, for example, such as only the region immediately surrounding the opening to the socket. The housing may provide a light source within its internal space, such as at a rearward internal wall, such that when activated, light is received by the (body) of the cassette, and light is transmitted therethough to the front facing portion.

In use for an aircraft cabin, if one is not already present, a recess is formed in a suitable support/host structure such as a seat, armrest or bulkhead, sized to receive the housing 2. Electrical wiring from the housing is then connected to the aircraft's power and data network. The housing is then secured into the recess by suitable means. The housing would be embedded into the respective support structure. The cassette 3 is then manually inserted into the housing. When in the home position, the screw fastener 13b can then be driven by a suitable tool such that the cassette is held firmly in place.

Figure 3:
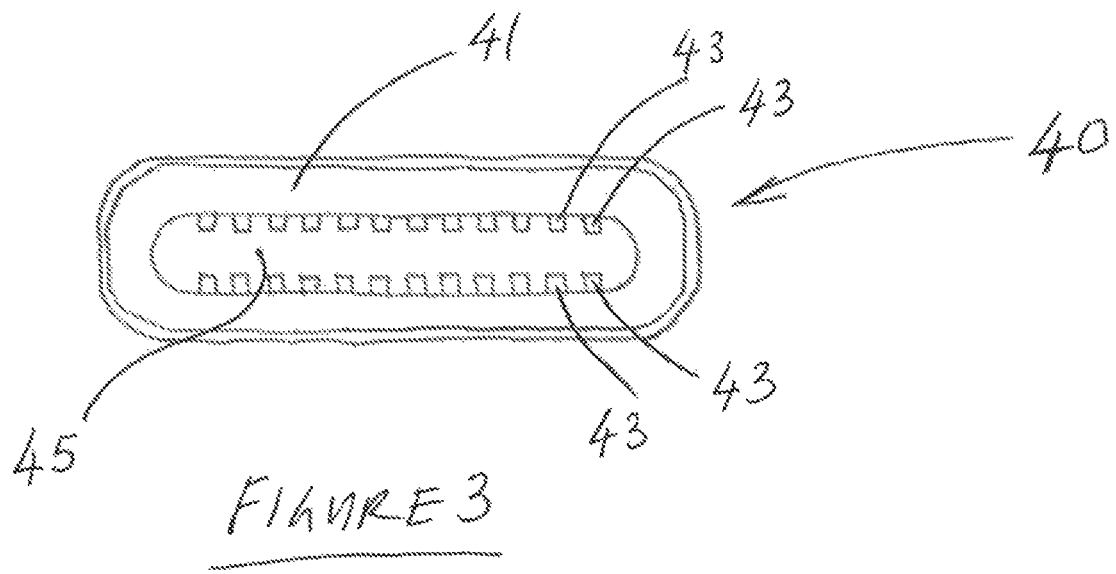
FIG. 3 is a schematic front elevation of a plug connector arranged to be connect with the socket of FIG. 2.

A device attached to a USB plug, such as a smartphone, can then be connected to the socket of the cassette, to provide connection to data and power. An example of a USB-C plug 40 is shown in FIG. 3. The plug 40 comprises a body/housing 41 which defines an internal space 45. Positioned internally of the space there are provided two opposing sets of electrical contacts 43. In use, the plug 40 is received in the socket of the cassette 3, and in so doing fits around the tongue 30, with the electrical contacts of the plug 40 making connection with the electrical contacts of the socket 30. The plug 40 effects a frictional engagement with the tongue 30.

Figure 5:
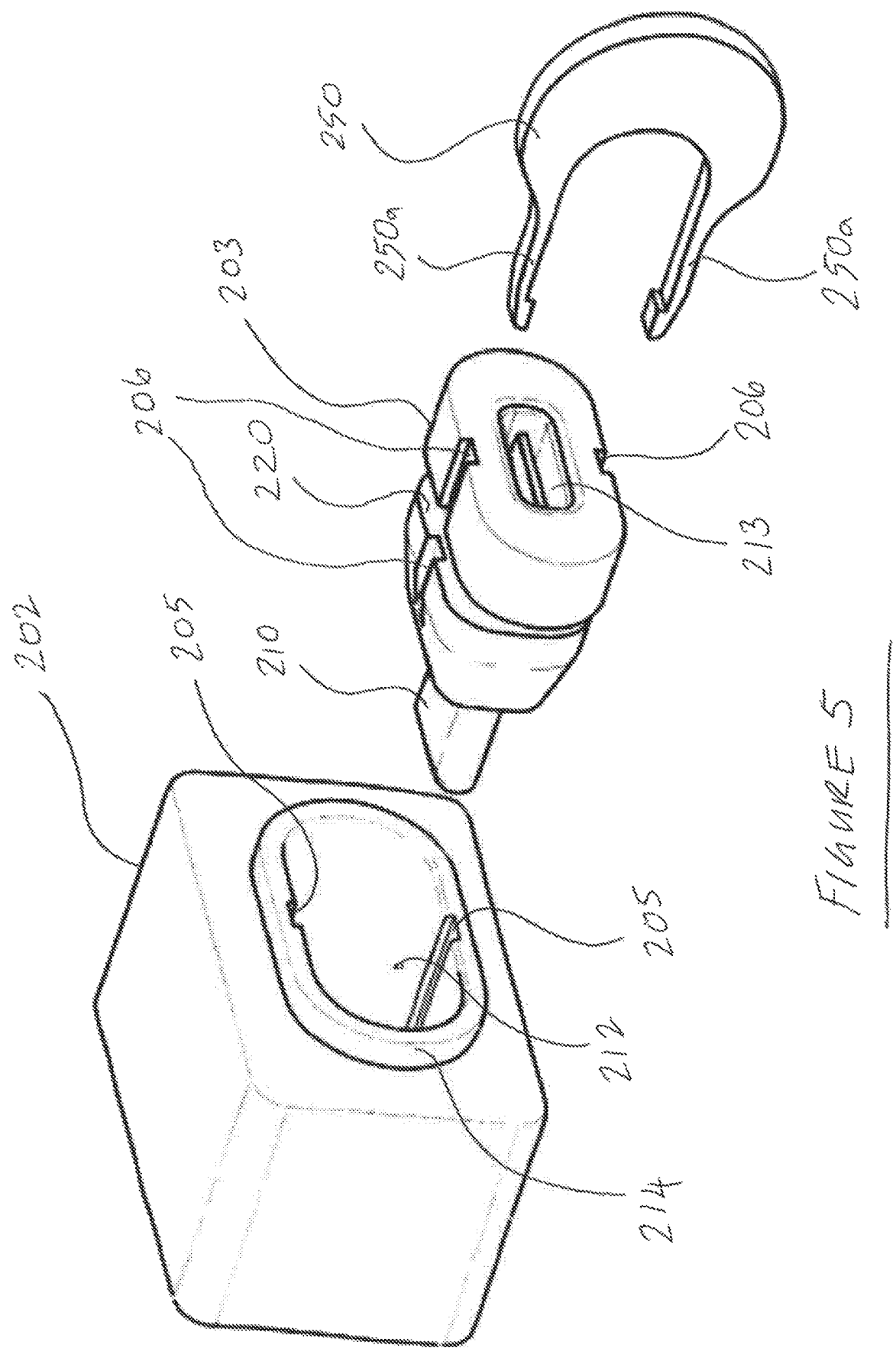
FIG. 5 is a schematic view of a second embodiment of the invention.

Reference is now made to FIG. 5 which shows a different embodiment, but provides the same core functionality as the above described embodiment. The assembly shown in FIG. 5 comprises a housing 202 and a cassette 203. The cassette comprises a USB-C socket which comprises an opening 213. The cassette 203 comprises a body which is provided with a retaining/latch surfaces 220. The surfaces 220 are configured to engage (either mechanically or frictionally) with an internal surface of the housing 202, and to thereby detachably retain the cassette within the housing. A special/custom tool 250 is provided which allows a user to remove the cassette from its position within the housing. The tool comprises a grip portion 250b and two limbs 250a. Each of the limbs is received by a respective channel formed by the channels 205 and 206, located on an inward facing surface of the housing and an outward surface of the cassette, respectively. The barbed ends of the limbs when slid through the channels engage with the cassette and allow a user to apply a pulling force which overcomes the mechanical/frictional engagement between the cassette and the housing such that the cassette can be removed.

A further point of note is that the housing 202 is provided with a status indicator 214, which surrounds the opening 212 to the housing. The status indicator 214 is made of a light guide material, and is optically connected to a light source, such as an LED. As per the embodiment described above, the light source may be provided in the housing. In contrast to the embodiment discussed above, the visual status indicator is provided on a front-facing portion of the housing, as opposed to the cassette, but achieves substantially the same functionality. In this way, the manufacture of the cassette may be simplified by no requirement for it to include a light guide.

Reference is made to FIG. 6, which shows a modified version of the embodiment of FIG. 5, in which a housing comprises two opposed resiliently biased jaws 302, which in use serve to grip the cassette 203. The jaws are biased by way of respective springs 309. Each of the jaws is mounted for opposing translational movement. As can be seen in FIG. 6, the cassette 303 is arranged to be urged between the jaws. In so doing, the outer (inclined) surface of the cassette, engages with each of the jaws to force them apart and thereby permit entry of the cassette internally of the housing. On continued travel, the surfaces 312 of the jaws engage with the surface 311 of the cassette. Immediately preceding that, the resilience of the springs then urges the jaws inwardly, to thereby retain the cassette in position within the housing. Further, in so doing, the interface 10 of the cassette is brought into electrical contact with an interface 110 of the housing. From FIGS. 8 and 9, it can be seen that the special tool 250 can be used to remove/extract the cassette from within the housing. Insertion of the tool causes it to engage with the jaws and causes sufficient opposing outward travel thereof to allow the cassette to pulled from the housing.

A further advantage of the arrangement of the resiliently biased jaws above is that in the absence of a cassette, the jaws may completely close off access to the interface 110 (and so minimise/restrict/prevent tampering or unauthorised access thereto).

Although particular mention has been made to use in aircraft cabins for passenger use, the above embodiments, and indeed the underlying inventive concept, can equally be beneficially applied to other contexts, such as other passenger vehicles/transportation (e.g. trains, buses, coaches), multi-media suites, conference facilities, educational facilities, lecture theatres, cinemas, auditoriums etc.

Figure 10:
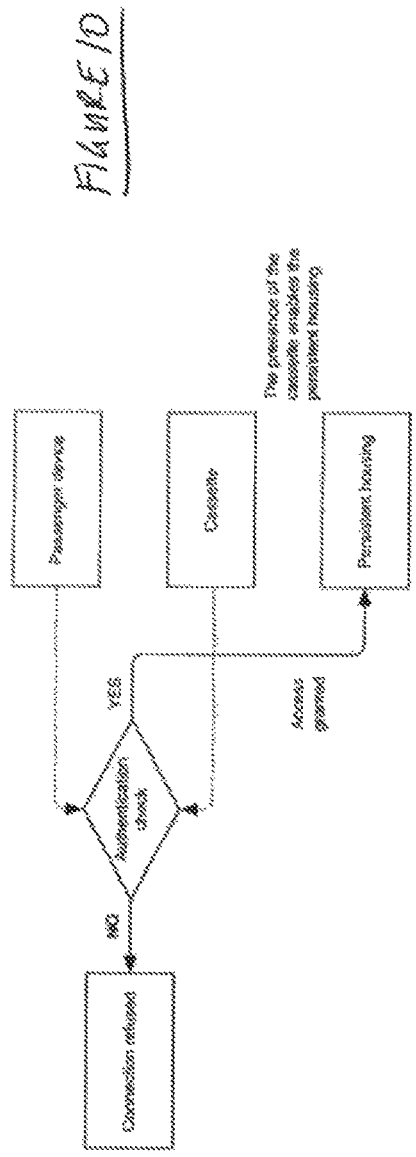
FIGS. 10, 11, 12 and 13 are flow diagrams showing various intelligent functionality performed by the assembly.
Figure 11:
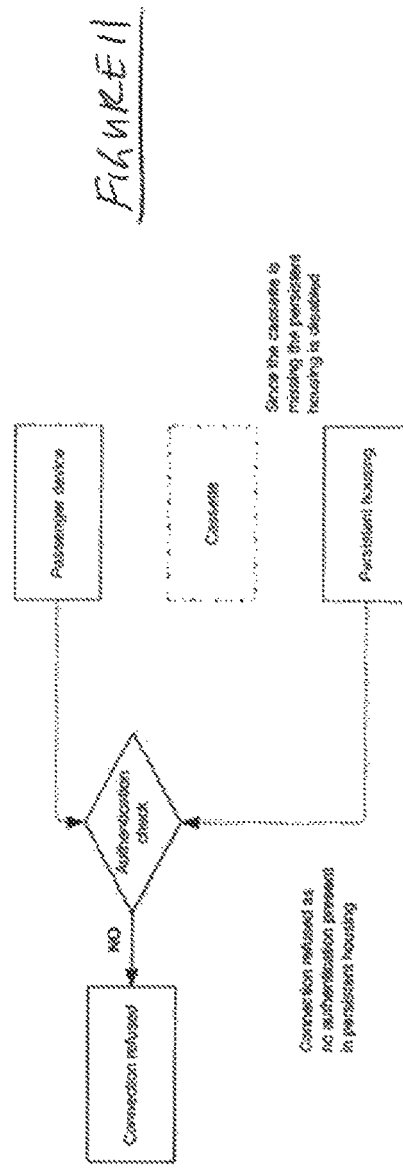

In the housing, or connected to and associated with the housing, there may be provided some intelligent circuitry and/or processing capability which enables control of connection functionality between the assembly and a user equipment (which is attached to a plug connector). This may comprise a chip or processor, and associated memory, which is incorporated with the housing or may be in communication with, but remote from, the housing. Reference is first made to FIGS. 10 and 11 which show how the intelligent functionality can be used to switch a connection on or off to an equipment which is plugged into the socket of the assembly. In FIG. 10, the intelligent functionality determines the presence of both a user device (referred here to as a passenger device in the context of an application to aircraft cabins) has been inserted into the socket of the cassette and is also required to consider whether the cassette is inserted and, indeed correctly inserted, into the housing. Suitable sensors may be provided to achieve this. In particular, the cassette may be provided with an authentication credential which can be read by the intelligent functionality. The credential may be realised as data which is stored on the cassette. In this arrangement the intelligent functionality, in broad terms, is arranged to selectively switch/determine whether to provide data and/or power connection which is available for use to the housing interface (for example as referenced 110 in the above described embodiment). It may be that the authentication check which is conducted before data and/or power connection is provided to the housing interface is solely reliant on whether there is determined to be a cassette within the housing which has been validated. As shown in FIG. 11, a connection to the housing interface is refused on the basis that either no cassette is inserted into the housing and/or an unauthorised or non-validated cassette has been detected as being present.

Figure 12:
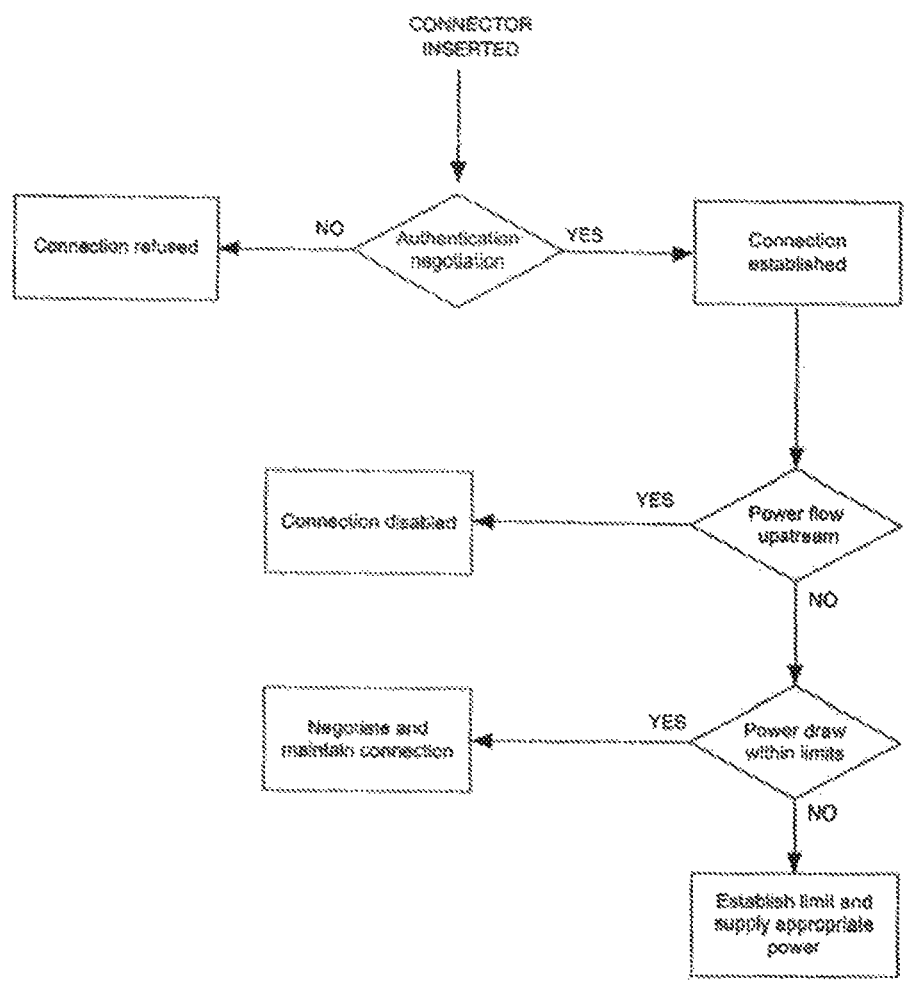

Reference is now made to FIG. 12 which shows a flow diagram which shows the operational monitoring functionality which is also performed by the intelligent functionality mentioned above. In general terms, this monitoring functionality allows and ensures that no power (or more generally, potentially harmful electrical signals) is sent or directed upstream i.e. from a user device connected to the assembly, and also that power which is being drawn by a user device is maintained within certain limits. Both of these aspects have important safety purposes, which is of particular relevance in the context of an aircraft. As can be seen in FIG. 12, if the intelligent functionality or processor detects or determines that the assembly is receiving a power input from a user device, then the connection between any upstream infrastructure (such as a power source and/or a source of data and/or a network connection) will be disconnected from the assembly (or more generally from the cassette). The intelligent functionality or processor also is configured to monitor the power which is drawn from an upstream source to a user device. The intelligent functionality or processor comprises a memory which includes predetermined power threshold criteria which if met and/or exceeded, cause the connection from upstream to the assembly to be disabled or disconnected. Alternatively, the power which is supplied to a user device may be set at a maximum within predetermined allowed values and/or be limited accordingly (based on negotiation signally between the assembly and the connected user device). It will be appreciated that signalling negotiation may take place between the assembly and a connected user device, to determine an appropriate power level (based on a combination of user device/power requirements and available power). In the context of power supplied in an aircraft cabin, if many users are drawing power from one and the same source, namely an aircraft's engine, at the same time, then it is important that the overall power consumption does not exceed a particular value. Therefore, regulation and/or modulation of power available to be drawn to a set, or subset, of users may be enforced. To this end a power management device may be provided which monitors the cumulative power delivered to multiple assemblies (at any one time) and the regulates power delivered/available reactively, and/or regulates with the assemblies to agree, or enforces, an initial or updated power available.

Figure 13:
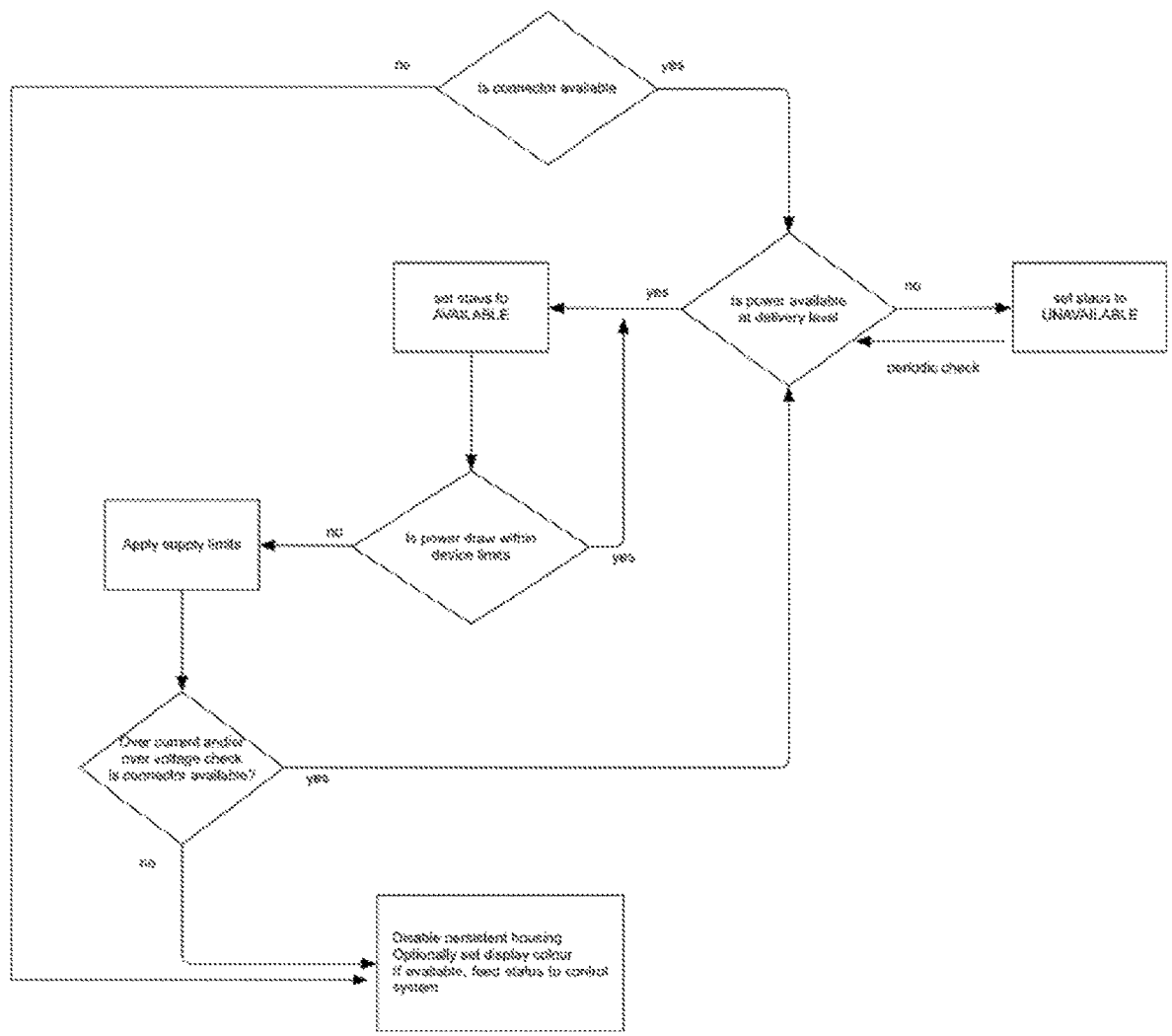

Reference is made to FIG. 13 which shows one example of the way in which the visual indicator which is provided at the front face of the assembly can be used to provide an indication to a user of the availability to draw power through the assembly from an upstream power source. As can be seen, by the processor or intelligent functionality monitoring the power which is available for use, the visual indicator can display either whether the power is available or unavailable. Each of these statuses could be shown as different colours as a flashing indication or an unbroken visual indication; it could also be shown as to whether the visual indicator is either on or off. As will also be seen from the flow diagram, the monitoring process includes checks as to whether or not power is to be drawn within (pre-agreed) limits.

The processor/intelligent functionality may be provided by what could be termed a device management feature which is shown schematically by reference numeral 500 in FIG. 9. When a network of multiple assemblies is present, each assembly may be provided with its own management feature, secured to the housing.

Furthermore, the device management feature may control a switch between an interface or connector which allows the assembly/housing to be selectively connected upstream and may alternatively comprise, or control, a switch which selectively connects or disconnects the electrical interface provided by the housing of the assembly. In this way, the assembly can be controllably connected or disconnected to an upstream network to/from an electrical connector which is received within the cassette.

In a further embodiment of the invention, which may be a modification of any of the above-mentioned embodiments, the cassette may include a readable cryptographic key. This may be in addition to an authentication identifier, to enable verified functionality and use of an inserted cassette into a housing. Furthermore, a connector of a user device which is receivable within the socket of the cassette may itself include an authentication device which reveals a verifiable identifier.

FIG. 14 shows a switch 501 and intelligent circuitry 500 as referred to in the above paragraphs.

The invention claimed is:

1. An electrical connector assembly, comprising a housing and an electrical connector receptacle arranged to receive a complementary electrical connector,
   the electrical connector receptacle arranged to be removably received within the housing to allow for replacement thereof when the receptacle becomes damaged or out-of-date, and the electrical connector receptacle arranged for use in an operational condition only when received within the housing,
   the electrical connector receptacle comprises a tongue with a plurality of electrical contacts arranged to connect with electrical contacts of the complementary electrical connector,
   the electrical connector assembly comprising two elongated guide limbs, and two channels arranged to receive the elongated limbs, wherein the guide limbs and channels together serve to provide mechanical alignment and location of the receptacle with the housing and wherein each channel allows a limb to slide along therein, and wherein the electrical connector receptacle is arranged solely for operational use when coupled with the housing in the operational condition.

2. The electrical connector assembly of claim 1 in which the receptacle comprises an electrical connector socket.

3. The electrical connector assembly as claimed in claim 1 or claim 2 in which the housing comprises a rigid structure which comprises an opening and an internal space arranged to removably receive the electrical connector socket.

4. The electrical connector assembly as claimed in claim 1 in which the tongue comprises a portion of printed circuit board.

5. The electrical connector assembly as claimed in any preceding claim in which the electrical connector receptacle comprises a USB connector.

6. The electrical connector assembly as claimed in claim 1 further comprising a support structure supporting the housing wherein the support structure is a seat, part of a seat, or a wall, or a bulkhead, and/or is part of a vehicle.

7. The electrical connector assembly as claimed in claim 1 in which the receptacle comprises one or more surfaces/formations arranged to engage with an internal surface of the housing, to thereby retain the receptacle in position.

8. The electrical connector assembly as claimed in claim 1 in which the receptacle and the housing are arranged to be connected together by way of a mechanical connection.

9. The electrical connector assembly as claimed in claim 1 in which the housing comprises an electrical interface arranged to be brought into electrical connection with an electrical interface of the receptacle.

10. The electrical connector assembly as claimed in claim 1 in which the housing comprises a light source which provides a visual status indicator indicative of an operational status.

11. The electrical connector assembly as claimed in claim 1 in which the assembly further comprises a processor, or intelligent circuitry, either provided by the housing, or connected to the housing and provided remotely, which is operative to selectively control a power and/or a data connectivity to an interface of the housing which connects to an interface of the receptacle.

12. The electrical connector assembly as claimed in claim 1 which comprises a processor or intelligent functionality, which serves to monitor power drawn by a connected user device from an upstream power source or upstream network.

13. An electrical connector as claimed in claim 1 which comprises a switch, which is operable to disconnect or block a signal which is received from a connected user device, progressing upstream.

\* \* \* \* \*